United States Patent [19]

Stukenborg

[11] 4,452,346
[45] Jun. 5, 1984

[54] BRAKE SHOE AND LINING ASSEMBLY

[75] Inventor: James L. Stukenborg, Xenia, Ohio

[73] Assignee: General Motors Corporation, Detroit, Mich.

[21] Appl. No.: 356,176

[22] Filed: Mar. 8, 1982

[51] Int. Cl.³ ............................................. F16D 69/04
[52] U.S. Cl. ................................. 188/250 G; 188/73.2
[58] Field of Search ............. 188/73.2, 250 B, 250 G; 192/70.13, 107 R

[56] References Cited

U.S. PATENT DOCUMENTS 1,673,027  6/1928  Thompson ..................... 188/250 G

FOREIGN PATENT DOCUMENTS 2427694  12/1975  Fed. Rep. of Germany ... 188/250 G
687714   3/1965   Italy ............................... 188/250 G
319856   10/1929  United Kingdom ........... 188/250 G Primary Examiner—Duane A. Reger
Attorney, Agent, or Firm—D. D. McGraw

[57] ABSTRACT

The assembly is made by using a formed and fully densified uncured segment of brake lining material. The lining and shoe surfaces to be mated are coated with adhesive, the adhesive is dried for a short time and the lining and shoe are pressed together. A punch then drives partially through the uncured brake lining material, forcing the still soft lining material into holes in the brake shoe, creating a mechanical interlock in addition to the adhesive bond. The shoe and lining are thus held together until fully cured. The staking can be easily performed without expensive confining molds. The adhesive is not required when the mechanical interlock is sufficiently strong to retain the lining under any expected brake torque conditions.

4 Claims, 5 Drawing Figures

BRAKE SHOE AND LINING ASSEMBLY

The invention relates to a brake shoe assembly having the brake lining material formed and fully densified but uncured until after assembly on the brake shoe, and the method of making the assembly. The uncured lining may be adhesively attached to the shoe rim when it is desired to use an adhesive bond as well as a mechanical interlock to hold the lining in position. In some arrangements it is not necessary to use an adhesive bond because the mechanical interlock is more than sufficient. The uncured lining is placed on the shoe rim, the rim having apertures formed therein. A series of punches are so arranged that they are in axial alignment with the rim apertures. The shoe and lining are placed in position relative to the punches and a suitable anvil is provided to back up the shoe rim. The punches then are driven partially through the uncured brake lining material, forcing the still soft material into the apertures in the brake shoe and creating a mechanical interlock. The shoe and lining assembly is then fully cured and the assembly is ready for use. The punching or staking operation is easily accomplished without requiring expensive confined molds. The method embodying the invention is capable of being used with a lining manufacturing process such as that disclosed and claimed in U.S. patent application Ser. No. 215,919, filed Dec. 12, 1980, as well as with linings made by other methods. The structure which is made in accordance with the invention includes the staked and cured lining attached to the shoe assembly.

IN THE DRAWING

Figure 1:
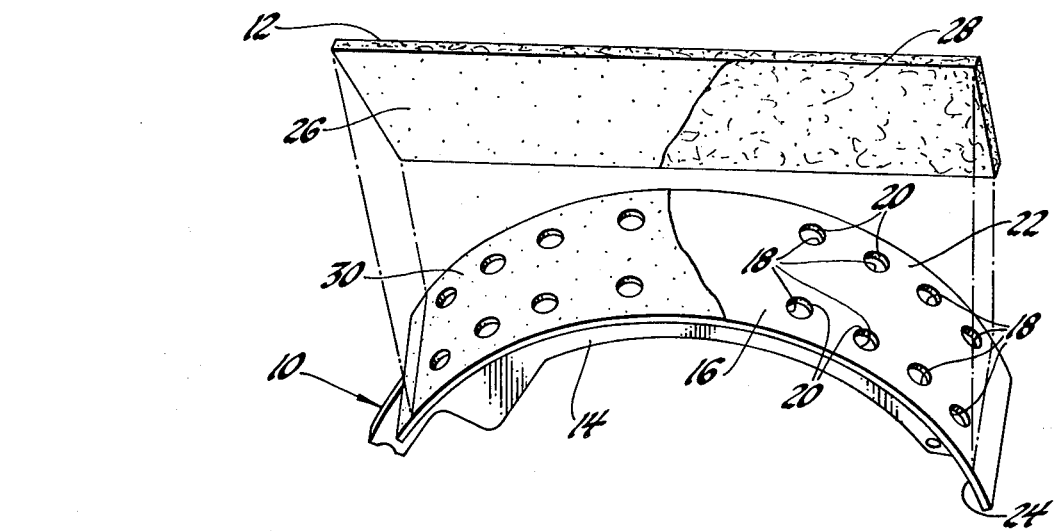
FIG. 1 is a perspective view showing an uncured lining segment in position to be placed on the rim of a brake shoe, and the interrelationship of the shoe and uncured lining segment at this point.

The brake shoe 10 is illustrated in FIG. 1 as being prepared to receive the uncured lining segment 12. The shoe 10 includes a web 14 having a rim 16 suitably attached thereto. The shoe is illustrated as being of the type normally used in a drum brake assembly. It is within the scope of the invention to make a brake shoe assembly for disc brakes. In a disc brake arrangement, a flat backing plate would be used instead of the arcuately formed shoe rim. The rim 16 is provided with a series of apertures 18 extending therethrough so as to be defined by aperture walls 20. The apertures 18 extend through the rim outer surface 22 and the rim inner surface 24 so that the aperture walls 20 extend from surface 22 to surface 24.

It is usually desirable to use an adhesive bond as well as a mechanical interlock to fasten the brake lining to the shoe rim. However, the adhesive bond is not necessary for some installations when the mechanical interlock provides sufficiently strong and effective areas to hold the lining in place and transmit brake forces therethrough to the shoe. In the preferred embodiment particularly illustrated in the drawing, an adhesive coating 26 is provided on the inner surface 28 of the uncured lining segment 12 and a similar adhesive coating 30 is provided on the portion of outer surface 22 which will engage the lining segment inner surface 28. Adhesives used for this purpose are well known in the brake art. Typically both surfaces are coated, the adhesive coats are dried for a short time, and the shoe and lining are pressed together. In the particular method embodying the invention herein disclosed and claimed, this step is performed while the lining segment is in the uncured state. The uncured lining segment can be readily arcuately formed to fit over a drum brake shoe rim, and is sufficiently soft to have portions displaced as will be described.

Figure 2:
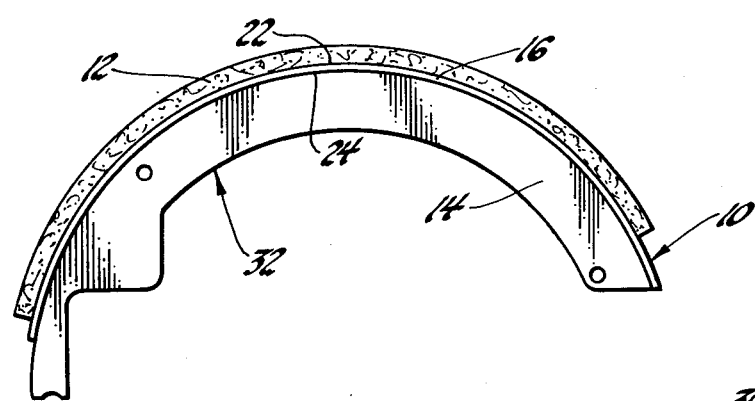
FIG. 2 is an elevation view of the assembly with the uncured lining segment in position on the shoe rim.
Figure 3:
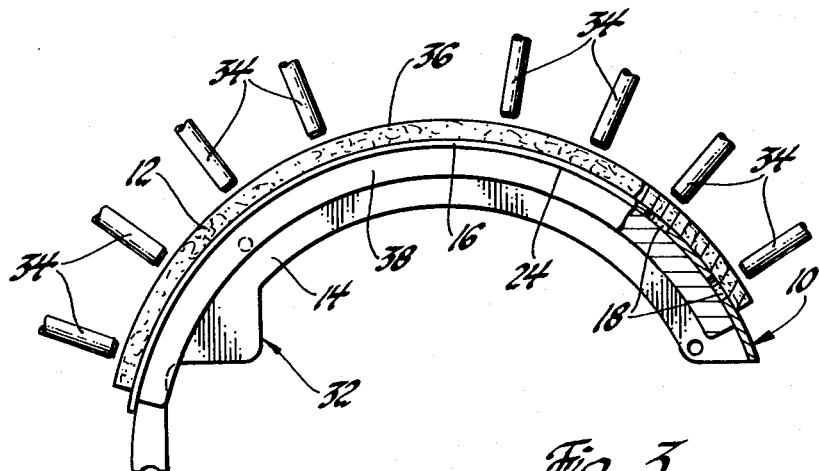
FIG. 3 is a schematic representation of an arrangement in which the assembly of FIG. 2 is placed in a punch machine, the punches being aligned for making the mechanical interlock.
Figure 4:
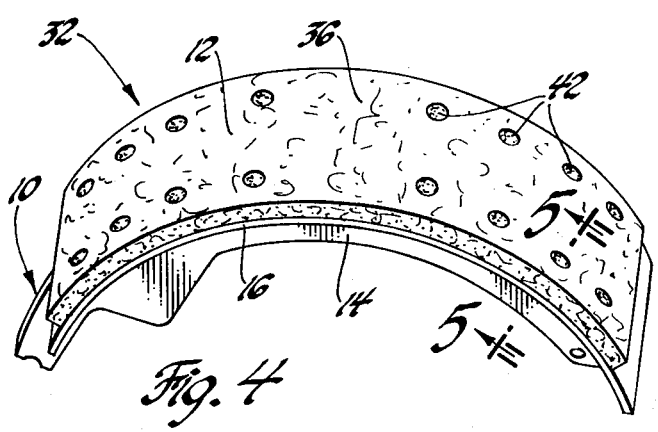
FIG. 4 is a perspective view of the shoe and lining assembly after the punching operation has been completed and the assembly removed from the punch machine. The representation may be considered to be that of the brake shoe assembly both before and after curing of the lining segment since the segment was previously formed and fully densified.
Figure 5:
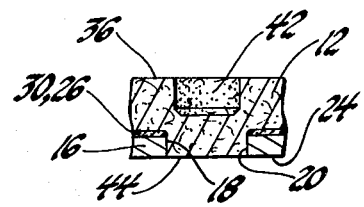
FIG. 5 is a fragmentary cross section view taken in the direction of arrows 5—5 of FIG. 4 and illustrating the mechanical interlock and adhesive bonding of the finished brake shoe assembly.

The assembly of FIG. 2 shows the uncured lining segment 12 in position on shoe rim 16 and at least partially bonded thereto when adhesive coat 26 and 30 have been aligned. This assembly 32 is then placed in a punch machine schematically illustrated in FIG. 3. By design, the assembly 32 is quickly located in the punch machine so that the punches 34 are all axially in alignment with the aperture 18 of rim 16 and are immediately adjacent the uncured lining segment outer surface 36.

An anvil 38 is schematically illustrated as engaging the shoe rim inner surface 24 so as to close the inner ends of apertures 18. The punches 34 are then stroked for a predetermined depth relative to the lining segment thickness so as to form a recess 42 in alignment with each aperture 18. Each recess is of a precisely defined volume created by displacing uncured lining material into the associated aperture 18 so that the displaced material 44 completely fills each aperture 18, engaging each aperture wall 20 and extending to the rim inner surface 24. Thus each aperture contains a plug formed by the displaced material which is still an integral part of the uncured lining segment 12. It is an important consideration in practicing the invention to so proportion the shape and size of each recess 42 in relation to each associated aperture 18 to assure the strength of each plug in relation to the main body of the lining segment. In some assemblies, it may be desirable to form apertures 18 only partially through the thickness of rim 16, so that the apertures are actually recesses and do not open through rim inner surface 40. This can reduce the cost of the punch machine even further, since the anvil 38, closely fitting the rim to close the illustrated apertures 18, need not be provided. Only a suitable shoe support will be needed during the punching operation.

The brake shoe assembly 32 is removed from the punch machine and is cured in a curing oven in a manner well known in the art. The assembly made in accordance with the invention requires no rivets, and the cost of manufacture is considerably reduced by reducing the need for expensive molds at various stages of operation.

The embodiments of the invention in which an exclusive property or privilege is claimed are defined as follows:

1. A brake shoe and brake lining assembly comprising:
   a brake shoe and a brake lining body positioned in side-by-side surface engaging relationship, said brake lining body having a first surface engaging said brake shoe and a second surface for friction braking, said brake shoe having wall means formed therein defining a series of openings and said brake lining body being preformed to conform to said brake shoe and covering said openings, said brake lining body having portions displaced within and from said lining body from said second surface into and filling said openings after said brake lining body has been preformed and positioned in side-by-side surface engaging relationship to said brake shoe in a manner to cover said openings, the displaced portions of said brake lining body and the wall means of said brake shoe openings cooperating to mechanically secure said brake lining body to said brake shoe.

2. A brake shoe and lining assembly comprising:
   a brake shoe having a plurality of apertures formed therethrough in a pattern arranged to provide for securing a brake lining thereto;
   a brake lining on said shoe and covering said apertures and having portions punched so as to have been displaced in situ within and from the body of the lining into and filling said apertures, said displaced portions mechanically securing the lining to the shoe, said lining portions having been displaced within and from the lining body before the lining was cured, and the lining thereafter having been cured with the result that the displaced lining material is sufficiently hard and has sufficient strength to serve as the primary means of retention of the lining on the shoe.

3. In a brake shoe and brake lining assembly in which the brake shoe and the brake lining each have first and second generally parallel surfaces, said first surfaces being in engagement with each other, said second surfaces being spaced from said first surfaces by the respective thicknesses of the brake shoe and the brake lining so that the entire thickness of the lining is available for use as the lining wears, said brake lining second surface providing a friction braking surface, and means securing the brake lining to the shoe, the improvement in said securing means comprising:
   a pattern of apertures formed in said brake shoe through at least said shoe first surface and forming spaces between said shoe first and second surfaces;
   and brake lining material displaced within and from the brake lining from said lining second surface toward and into said spaces formed by said apertures in said brake shoe and filling said spaces to define lining protrusions cooperating with said apertures to mechanically lock and secure the brake lining to the brake shoe.

4. A brake shoe and lining assembly comprising:
   a brake shoe having a plurality of apertures formed therein in a pattern arranged for securing a brake lining thereto;
   a brake lining having a friction braking surface and a shoe engaging surface, said lining being on said shoe and covering said apertures, portions of the material forming said lining having been mechanically displaced in a direction away from said friction braking surface toward and extending through said shoe engaging surface and filling said apertures, the volume of material displaced in the direction away from said friction braking surface being substantially equal to the volume of the apertures within said brake shoe, leaving recessed apertures from which the material was displaced extending inwardly from said friction braking surface only part way toward said shoe engaging surface, the displaced material cooperating with the surfaces of said shoe defining said apertures to provide a mechanical interlock securing said lining to said shoe in brake torque transmittable relation.

* * * * *